United States Patent Office 2,758,857
Patented Aug. 14, 1956

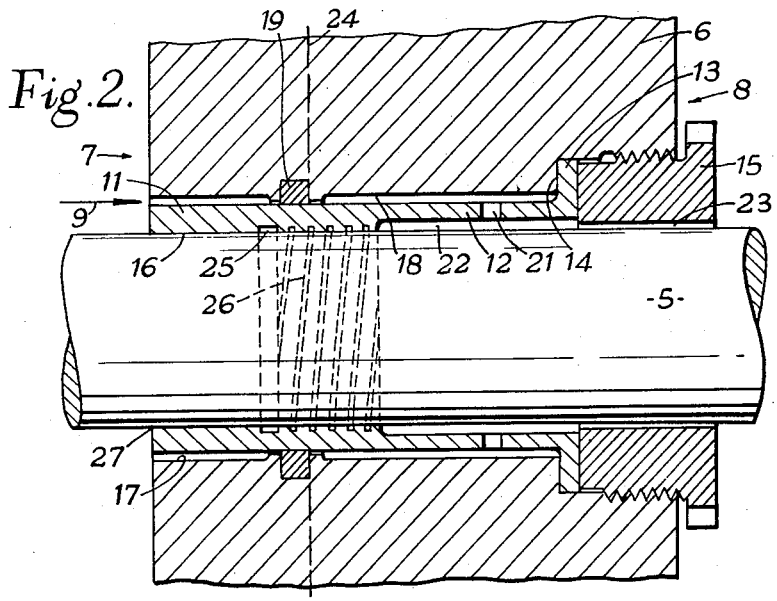
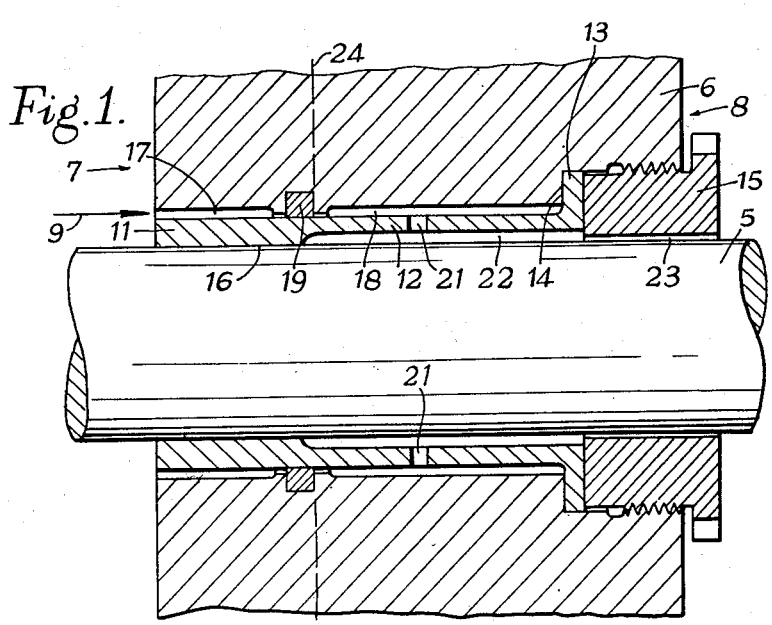

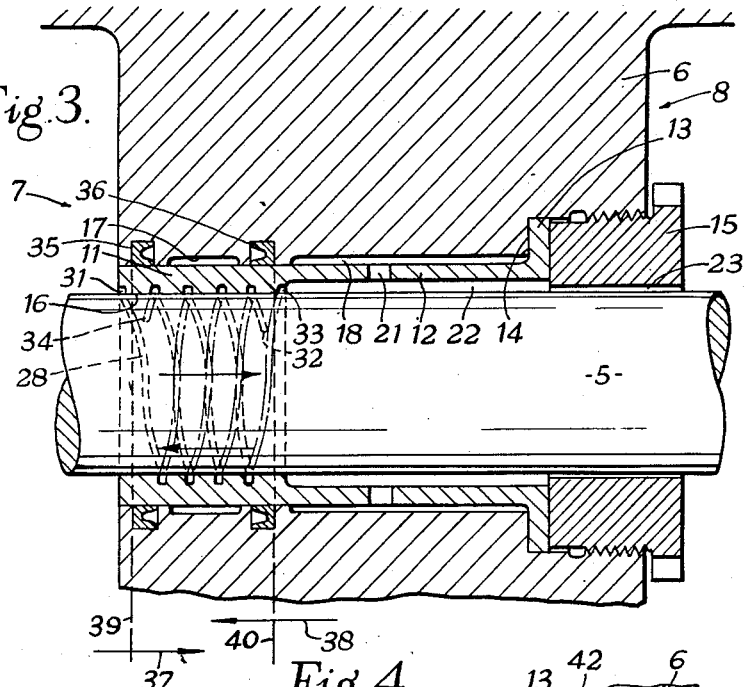
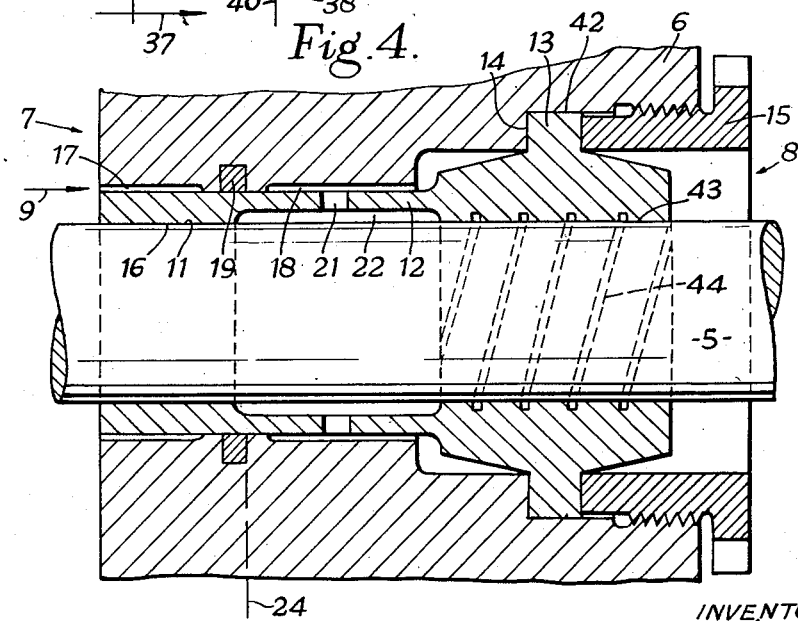

2,758,857

FLUID PRESSURE SEALS

Robert Sidney Claridge Smith, Chislehurst, England

Application October 16, 1953, Serial No. 386,536

Claims priority, application Great Britain
October 16, 1952

11 Claims. (Cl. 286—26)

The present invention relates to fluid pressure seals of the kind adapted for preventing leakage of fluid from a high pressure zone to a low pressure zone through a clearance between two parts arranged for relative sliding or rotary movement one within the other, in which a stiff but nevertheless resiliently deformable main sealing ring located between the two parts is anchored to one of them, has a working surface slidably or rotatably engaging a corresponding working surface on the other part through a film of the fluid to be sealed, and is so arranged that a pressure difference existing between the two zones at any moment is adapted to deform it resiliently to cause its working surface to engage more tightly against the working surface on the said other part. The terms "high pressure zone" and "low pressure zone" used above and elsewhere in this specification are to be interpreted so far as the context permits, to include not only zones which are permanently at high and low pressures respectively, but also zones which are only temporarily at such pressures, e. g. where the pressures in the two zones are periodically reversed.

An important object of this invention is to achieve a high order of sealing at the same time as efficient lubrication and hence low wear at the said cylindrical working surfaces.

With this object in view, according to the present invention, there is provided, between the main sealing ring and the part to which it is anchored, an annular clearance space divided by an auxiliary sealing ring into two portions communicating respectively with the high and low pressure zones, the said auxiliary sealing ring being located in such a position that the effective area of the main sealing ring loaded at any moment by the higher fluid pressure in a direction to deform it as aforesaid bears a ratio of between 1:0.5 and 1:1.1 (and preferably between 1:0.8 and 1:0.9) to the area of the working surface of said main sealing ring.

The invention is illustrated by way of example in the accompanying drawings in which:

Fig. 1 is a diagrammatic cross-section illustrating one embodiment of the invention, Fig. 2 is a diagrammatic cross-section illustrating a modification of the embodiment illustrated in Fig. 1, Fig. 3 is a diagrammatic cross-section illustrating a further embodiment of the invention intended for use in cases where pressure is applied alternately from two opposite directions, and Fig. 4 is a diagrammatic cross-section illustrating yet another embodiment in which means are provided for resisting side loads.

The same references are used to indicate similar parts in the several figures of the drawings.

Referring to Fig. 1 of the drawings, a member 5 is arranged for rotary and/or sliding movement in a housing 6 on one side of which is an oil-filled high pressure zone 7 and on the other side a low-pressure zone 8, so that there is a pressure difference acting in the direction of the arrow 9. A stiff but nevertheless resiliently deformable main sealing ring 11 located between the member 5 and the housing 6 is connected by a relatively thin tubular extension 12 to an anchoring flange 13 which is clamped against an annular shoulder 14 formed in the housing 6 by means of a clamping nut 15. The sealing ring 11 has a cylindrical working surface 16 which rotatably and/or slidably engages the member 5 through a thin film of oil (not shown) from the zone 7.

Between the outer surface of the sealing ring 11 and its extension on the one hand and the housing 6 on the other hand there is provided a clearance space 17, 18 which is divided by an auxiliary sealing ring 19 into two separate portions, namely a portion 17 communicating directly with the high pressure zone 7 and a portion 18 communicating with the low pressure zone 8 through holes 21 in the extension 12 and thence through clearance spaces 22, 23 formed between the extension 12 and the clamping nut on the one hand and the member 5 on the other hand.

The auxiliary sealing ring 19 consists in this embodiment of a resilient synthetic rubber composition ring which is seated in a groove in the housing 6 and bears against the cylindrical outer surface of the member 11. The position of the auxiliary sealing ring 19 is such that the effective external area of the main sealing ring 11 loaded by the high fluid pressure in the clearance space portion 17 bears a ratio of approximately 1:0.85 to the area of the working surface 16.

The limit of the extension of the low-pressure zone through clearance spaces 23 and 22, holes 21 and clearance space 18 is indicated diagrammatically by a broken line 24 which will be referred to for convenience as the "pressure line." It will be seen that the provision of the holes 21 ensures that any oil from the high pressure zone that might penetrate beyond the auxiliary sealing ring 19 can escape from the space 18, so as to prevent a high pressure being built up in this last-mentioned space.

The modification illustrated in Fig. 2 is basically similar to the embodiment according to Fig. 1, but has a main sealing ring 11 which covers a relatively greater length along the member 5 without proportionally reducing the ratio of the effective external area of the ring under high pressure loading to the area of the working surface 16 engaging the member 5. This is achieved firstly by the provision of an annular groove 25 which interrupts the working surface 16 in the middle and secondly by a helical groove 26 which forms a passage connecting the groove 25 with the low pressure zone. It will be apparent that the total area of the working surface 16 in this case is reduced not only according to the width of the groove 25 but also according to the width of the groove 26.

In this modification, when the pressure difference between the zones 7 and 8 is high, the end of the working surface 16 adjacent the zone 7 will bear against the external surface of the member 5 with a higher pressure than any other part of the ring. Under these conditions sufficient oil can penetrate between the working surface 16 of the main sealing ring and the external surface of the member 5 to form a satisfactory film face for lubricating these surfaces, while at the same time maintaining an effective seal between the two zones. In addition this higher pressure will help to prevent the entry of grit and like impurities from the zone 7 between the working surfaces, especially if the working surface 16 terminates in an accurately ground edge 27.

The embodiment illustrated by Fig. 3 is arranged so as to operate effectively with pressure applied alternately from two opposite directions, i. e. where the zone 7 is alternately a high-pressure and a low-pressure zone and zone 8 is alternately a low-pressure and high pressure zone respectively. With this end in view, the working surface 16 of the main sealing ring 11 is formed with two separate alternating helical grooves 28, 29. One of these grooves 28 is open to the zone 7 at 31 and terminates at 32 so as to be blind to the zone 8, while the other groove 29 is open to the zone 8 at 33 and terminates at 34 so as to be blind to the zone 7. The single auxiliary sealing ring 19 of Figs. 1 and 2 is replaced in this embodiment by two separate U-section sealing rings 35, 36 each of which is arranged to operate only to seal fluid pressures which have passed the other. Thus, when 7 is the high pressure zone the fluid pressure from that zone acting in the direction of arrow 37 passes ring 35 and is sealed by ring 36, whereas when 8 is the high pressure zone, the fluid pressure from that zone acting in the direction of arrow 38 passes ring 36 and is sealed by ring 35. At the same time, the pressure line shifts axially to and fro between lines 39, 40 in order automatically to establish the required pressure zone limits.

Fig. 4 illustrates an embodiment essentially similar to that of Fig. 1, but in this case the end of the tubular extension remote from the main sealing ring 11 is provided not only with an anchoring flange 13 but also with two cylindrical surfaces 42, 43 for resisting side loads. One of these surfaces 42 is formed on the flange 13 and derives radial support from the surrounding cylindrical surface of the housing 6, while the other surface 43 is formed on the side opposite the flange and is arranged for sliding engagement with the external cylindrical surface of the member 5. The clearance space 22 in this case communicates with the low pressure zone 8 through a helical groove 44 formed in the surface 43.

In practice, the optimum thickness of the main sealing ring 11 will depend upon a number of different factors including the pressure difference between zones 7 and 8 and the material of which the ring 11 is made. It must, however, be resiliently deformable by the pressure difference so as to cause its working surface 16 to engage noticeably more tightly against the working surface cooperating therewith.

In the embodiments illustrated the member which is movable with respect to the fluid seal is shown anchored to a housing 6 within which a member 5 in the form of a rod or shaft is arranged to move. It will be apparent, however, that such a seal can equally well be anchored to an inner member such as a piston which is movable relatively to an outer member such as a cylinder.

Furthermore, in cases where the seal is required to be capable of withstanding wide ranges of operating temperatures, the auxiliary sealing ring 19 (Figs. 1, 2 and 4) or rings 35, 36 (Fig. 3) are preferably made of metal instead of synthetic rubber composition.

I claim:

1. A fluid pressure seal for preventing leakage from a high pressure zone to a low pressure zone through a gap between cylindrical surfaces formed on two relatively movable parts arranged one within the other, comprising in combination a stiff but resilient and radially deformable main sealing ring located between the two parts and having a cylindrical working surface engaging the cylindrical surface of one of said two parts and an opposite cylindrical surface separated from the cylindrical surface of the other of said two parts by an annular clearance space; means for flexibly connecting said main sealing ring to said other part; and an auxiliary sealing ring located in said annular clearance space so as to divide the same into two portions communicating respectively with said high and low pressure zones.

2. A fluid pressure seal as claimed in claim 1, wherein said means for flexibly connecting said main sealing ring to said other part comprises a tubular extension provided on one end of said main sealing ring having an anchoring flange formed at the end thereof and anchored thereby to said other part, said tubular extension being relieved on the side adjacent said one of said two parts so as to have a smaller wall thickness than said main sealing ring.

3. A fluid pressure seal as claimed in claim 2, wherein said tubular extension has at least one aperture formed in the wall thereof.

4. A fluid pressure seal as claimed in claim 3, wherein the cylindrical working surface of the main sealing ring is interrupted in the middle by an annular groove and is formed with at least one channel interconnecting said annular groove with said low pressure zone.

5. A fluid pressure seal as claimed in claim 1, wherein the auxiliary sealing ring is located in a position opposite an end part of the working surface of the main sealing ring adjacent the low pressure zone and the working surface of the main sealing ring at the end adjacent the high pressure zone terminates in a sharp rectangular edge.

6. A fluid pressure seal as claimed in claim 1, wherein said main sealing ring is composed of a resilient metal and said auxiliary sealing ring is composed of a rubber-like composition.

7. In combination, two relatively movable parts having cylindrical male and female surfaces located in coaxial spaced relationship one within the other; a stiff but resilient and radially deformable main sealing ring located between said two parts and having a cylindrical working surface engaging the cylindrical surface of one of said two parts and an opposite cylindrical surface separated by an annular clearance space from the cylindrical surface of said other part; means for anchoring said main sealing ring to said other part; and an auxiliary sealing ring located between the opposite cylindrical surface of said main sealing ring and the cylindrical surface of said other part in a position closer to one end of the working surface of the main sealing ring than to the other end of said working surface.

8. A combination as claimed in claim 7, wherein the auxiliary sealing ring is engaged in a groove in the part to which the main sealing ring is anchored and bears against a cylindrical surface on the side of the sealing ring opposite the side formed with the working surface.

9. A combination as claimed in claim 7, wherein the auxiliary sealing ring is located in a position substantially opposite the said one end of the working surface of the main sealing ring.

10. A combination as claimed in claim 7, wherein two auxiliary sealing rings are provided on said opposite side of the main sealing ring and are located respectively close to the two opposite ends of the working surface of said main sealing ring and wherein parts of the working surface of said main sealing ring are cut away and communicate respectively with opposite ends of said main sealing ring.

11. A combination as claimed in claim 7, wherein the means for anchoring the main sealing ring comprise a tubular extension formed integrally on one end thereof; an anchoring flange formed integrally with said tubular extension at the end thereof and anchored to said other part, said anchoring flange having a cylindrical circumferential surface supported against a corresponding cylindrical surface on said other part; and a support part formed integrally with both said tubular extension and said anchoring flange and having a cylindrical surface in sliding engagement with the cylindrical working surface of said one of said two parts.

References Cited in the file of this patent

UNITED STATES PATENTS 446,699  Twining _____ Feb. 17, 1891

FOREIGN PATENTS 583,194  Great Britain _____ Dec. 11, 1946